(12) United States Patent
Kulaga et al.

(10) Patent No.: US 11,513,878 B2
(45) Date of Patent: Nov. 29, 2022

(54) SYSTEMS AND METHODS FOR DETECTING BEHAVIORAL ANOMALIES IN APPLICATIONS

(71) Applicant: Acronis International GmbH, Schaffhausen (CH)

(72) Inventors: Andrey Kulaga, Moscow (RU); Stanislav Protasov, Moscow (RU); Serguei Beloussov, Costa Del Sol (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 17/180,912

(22) Filed: Feb. 22, 2021

(65) Prior Publication Data

US 2021/0406109 A1    Dec. 30, 2021

Related U.S. Application Data

(60) Provisional application No. 63/044,587, filed on Jun. 26, 2020.

(51) Int. Cl.
| | | |
|---|---|---|
| *G06F 11/34* | (2006.01) | |
| *G06F 11/07* | (2006.01) | |
| *G06N 7/00* | (2006.01) | |

(52) U.S. Cl.
CPC ...... *G06F 11/0751* (2013.01); *G06F 11/3438* (2013.01); *G06F 11/3452* (2013.01); *G06N 7/005* (2013.01); *G06F 2201/805* (2013.01); *G06F 2201/835* (2013.01)

(58) Field of Classification Search
CPC ...... G06F 11/3438; G06F 11/07; G06F 11/34; G06F 11/0751; G06F 11/3447; G06F 11/3452; G06F 11/302; G06F 2201/865; G06F 2201/805; G06N 7/005
See application file for complete search history.

(56) References Cited

U.S. PATENT DOCUMENTS 10,459,827 B1 * 10/2019 Aghdaie ............... A63F 13/67
10,635,519 B1 *  4/2020 Tang ................. G06F 11/3447
(Continued)

FOREIGN PATENT DOCUMENTS

WO     2019075399 A1    4/2019

*Primary Examiner* — Yolanda L Wilson
(74) *Attorney, Agent, or Firm* — ArentFox Schiff LLP; Michael Fainberg

(57) ABSTRACT

Aspects of the disclosure relate to the field of detecting a behavioral anomaly in an application. In one exemplary aspect, a method may comprise retrieving and identifying at least one key metric from historical usage information for an application on a computing device. The method may comprise generating a regression model configured to predict usage behavior associated with the application and generating a statistical model configured to identify outliers in the data associated with the at least one key metric. The method may comprise receiving usage information in real-time for the application. The method may comprise predicting, using the regression model, a usage pattern for the application indicating expected values of the at least one key metric. In response to determining that the usage information does not correspond to the predicted usage pattern and does not comprise a known outlier, the method may comprise detecting the behavioral anomaly.

20 Claims, 3 Drawing Sheets

(56) References Cited

U.S. PATENT DOCUMENTS

| | | | | |
|---|---|---|---|---|
| 2015/0082432 A1* | 3/2015 | Eaton | ............... | G06F 9/5072 |
| | | | | 726/23 |
| 2015/0212869 A1* | 7/2015 | Chen | ............... | G06F 11/3612 |
| | | | | 714/38.1 |
| 2017/0364818 A1* | 12/2017 | Wu | ............... | G06F 11/0754 |
| 2019/0377652 A1* | 12/2019 | Sahoo | ............... | G06F 11/302 |
| 2019/0392331 A1* | 12/2019 | Vincent | ............... | G06N 5/04 |
| 2020/0259852 A1* | 8/2020 | Wolff | ............... | H04L 67/10 |
| 2020/0344252 A1* | 10/2020 | Menon | ............... | G06F 16/906 |

\* cited by examiner

SYSTEMS AND METHODS FOR DETECTING BEHAVIORAL ANOMALIES IN APPLICATIONS

CROSS-REFERENCE TO RELATED APPLICATIONS

This application claims the benefit of U.S. Provisional Application No. 63/044,587, filed Jun. 26, 2020, which is herein incorporated by reference.

FIELD OF TECHNOLOGY

The present disclosure relates to the field of data security, and, more specifically, to systems and methods for detecting behavioral anomalies in applications.

BACKGROUND

Stored data and applications are often prone to malicious cyber-attacks depending on their storage location and associated network connections. To monitor for intrusions and malware, organizations utilize monitoring systems that detect behavioral anomalies. Conventional monitoring systems require, however, manual definition of alert thresholds for key application metrics. Setting alert thresholds is firstly labor intensive. Alert thresholds also prevent detection of abnormal behavior when key metrics are not within intervals defined by an administrator. For example, an alert threshold set by the administrator may identify a CPU usage percentage greater than 65% on a given server during the time between 12:00 am and 6:00 am as anomalous. However, a malicious entity utilizing only 64% of the CPU processing would not be detected.

Other the other hand, alert thresholds may also lead to several false positives. For example, an authorized user may in fact utilize the server during the time window described above such that 70% of the CPU processing is used at one point. Despite the usage occurring by an authorized user, a conventional monitoring system would trigger a false positive when declaring an anomaly. Depending on how the system is designed to react to a trigger, access by the authorized user can be made difficult or impossible. Accordingly, there is a need for an improved approach to anomaly detection.

SUMMARY

Aspects of the disclosure relate to the field of detecting a behavioral anomaly in an application. In one exemplary aspect, a method may comprise retrieving historical usage information for an application on a computing device. The method may comprise identifying at least one key metric from the historical usage information. The method may comprise generating a regression model configured to predict usage behavior associated with the application based on data associated with the at least one key metric. The method may comprise generating a statistical model configured to identify outliers in the data associated with the at least one key metric. Subsequent to generating the regression model and the statistical model, the method may comprise receiving usage information in real-time for the application. The method may comprise predicting, using the regression model, a usage pattern for the application indicating expected values of the at least one key metric. In response to determining that the usage information received in real-time does not correspond to the predicted usage pattern, the method may comprise determining via the statistical model whether the usage information comprises a known outlier. In response to determining that the usage information does not comprise the known outlier, the method may comprise detecting the behavioral anomaly. The method may comprise generating an alert indicative of the behavioral anomaly.

In some aspects, the historical usage information occurred within a time interval that is periodic, and predicting the usage pattern further comprises using a version of the regression model associated with the time interval.

In some aspects, the statistical model is a probability distribution that highlights data points associated with the at least one metric that are not anomalous.

In some aspects, the at least one key metric comprises at least one of (1) client connections, (2) latency, (3) number of account lookups, (4) bytes read, and (5) number of file lookups.

In some aspects, in response to determining that the usage information received in real-time corresponds to the predicted usage pattern or that the usage information comprises the known outlier, the method may comprise determining that the behavioral anomaly has not occurred and not generating the alert.

In some aspects, determining that the usage information received in real-time does not correspond to the predicted usage pattern further comprises determining that an average difference, between values of the at least one key metric from the usage information received in real-time and the expected values of the at least key metric according to the predicted usage pattern, exceeds a threshold difference.

In some aspects, the method may comprise receiving a response to the alert indicating that the behavioral anomaly is a false positive, and automatically increasing the threshold difference.

In some aspects, the method may comprise receiving a response to the alert indicating that the behavioral anomaly is a false positive and adjusting both the regression model and the statistical model based on the usage information received in real-time, wherein the regression model is retrained on an updated dataset and the statistical model indicates an updated outlier.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detecting behavioral anomalies in applications. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In order to address the shortcomings of conventional monitoring systems, an anomaly detection system should require no manual work to train models, work for any type of device, automatically detect anomalies, tune the definition of anomalies based on user needs, adapt thresholds such that anomalies can be detected independent of system load, be highly accurate, and decrease alert-spam (e.g., false positives).

Figure 1:
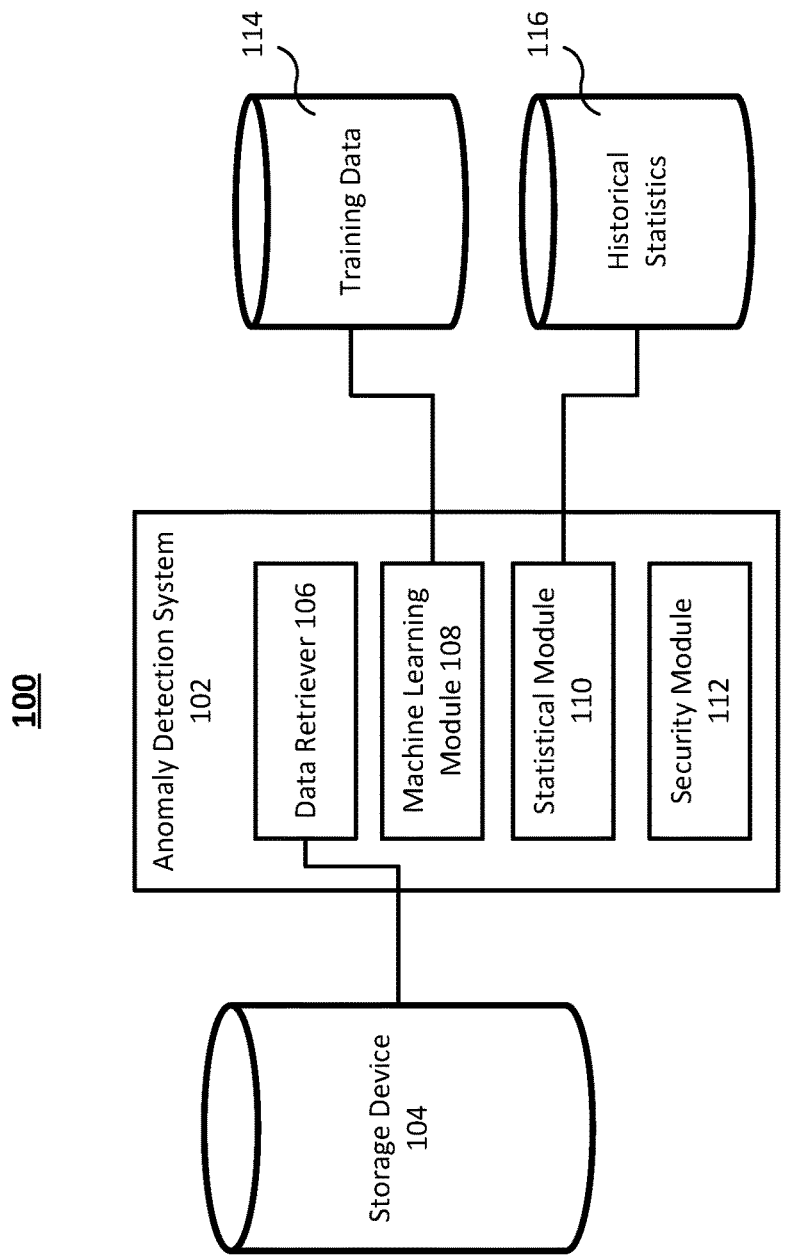
FIG. 1 is a block diagram illustrating a system for detecting behavioral anomalies in applications, in accordance with aspects of the present disclosure.

FIG. 1 is a block diagram illustrating system 100 for detecting behavioral anomalies in applications, in accordance with aspects of the present disclosure. Anomaly detection system (ADS) 102 may be a module of a security software such as an anti-virus software. ADS 102 may be stored in storage device 104 to monitor for anomalies on storage device 104, or may be stored on a different device and communicate with storage device 104 over a network such as the Internet. ADS 102 may be comprised of multiple components such as data retriever 106, machine learning module 108, statistical module 110, and security module 112.

Figure 3:
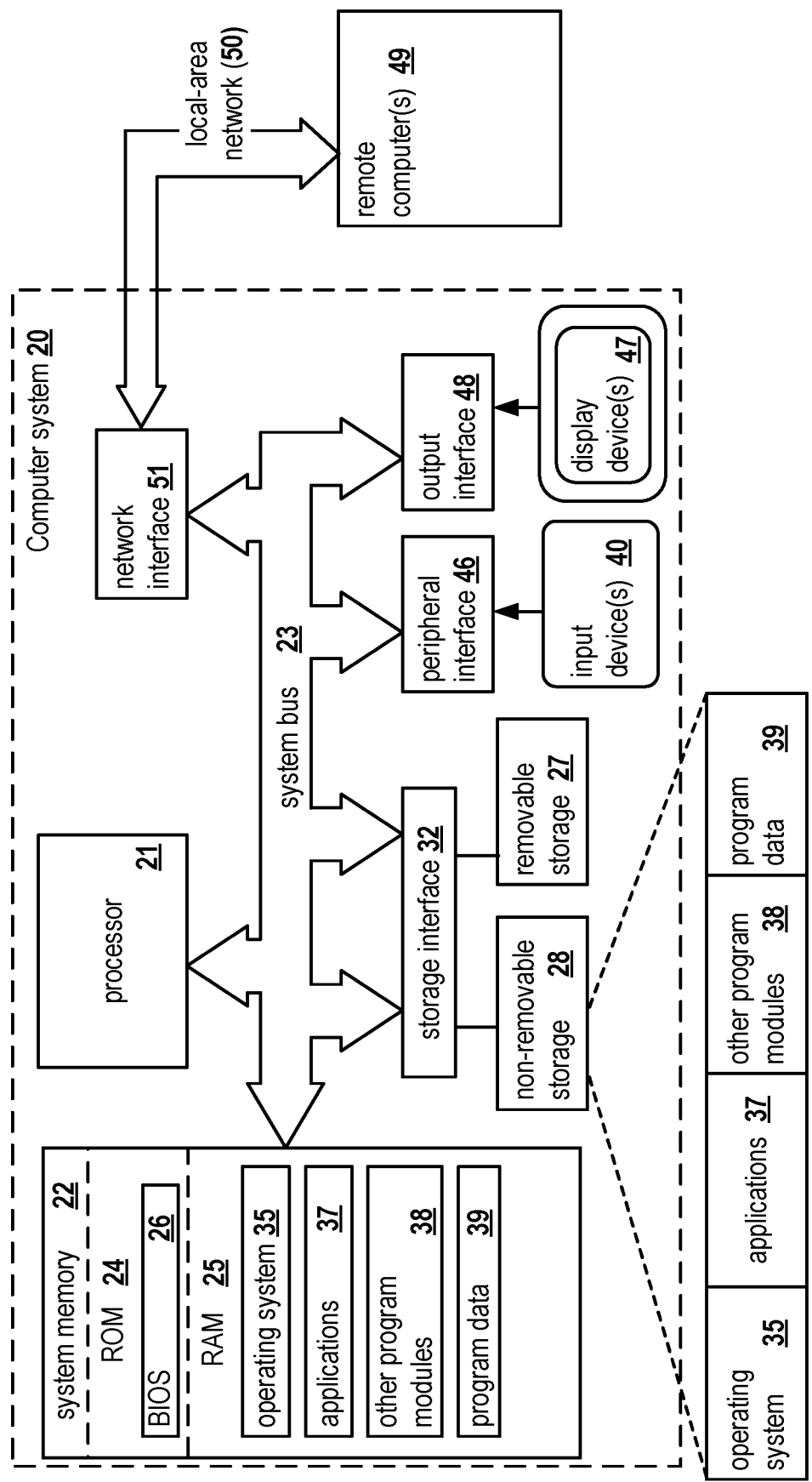
FIG. 3 presents an example of a general-purpose computer system on which aspects of the present disclosure can be implemented.

In an exemplary aspect, data retriever 106 of ADS 102 may be configured to retrieve historical usage information for an application on a computing device (e.g., computer system described in FIG. 3). The historical usage information may include details such as when the application was accessed, by whom, device state information (e.g., RAM consumption, CPU usage percentage, storage space, etc.), requests made to the application, requests made by the application, network connections utilized by the application (e.g., IP addresses), etc. In some aspects, the historic usage information may account for all information since the application was installed on the computing device. In some aspects, the historic usage information may be for a given time interval (e.g., Jun. 1, 2020 at 12:00 am to Jun. 2, 2020 at 12:00 am). In some aspects, the historic usage information may be for a periodic time interval. For example, data retriever 106 may retrieve information for every Monday since the application was installed. Based on the data specifically for Monday, ADS 102 can predict behavior for a subsequent Monday.

From the historic usage information, data retriever 106 may identify at least one key metric. A key metric may be, in association with the application, a number of client connections, command and execution latency, a number of account lookups, an amount of bytes read, and a number of file lookups. It should be noted that many other key metrics may exist as well, such as an amount of bytes written, a usage time length, features accessed in the application, etc. Data retriever 106 may parse the historic usage information to identify at least one key metric and generate a data structure with data associated with the at least one key metrics. For example, if the key metric identified is the amount of bytes read in association with the application, the data structure may include time stamps and the respective numbers of bytes read. This data structure is training data 114 and is utilized by ADS 102 to generate machine learning module 108, which is configured to predict usage behavior associated with the application based on data associated with the at least one key metric.

In some aspects, machine learning module 108 may be a one-class support vector machine (SVM) used for novelty detection. The one-class SVM may be trained used key metrics acquired from historic usage information. Because anomalies may be quite rare, a majority of the data 114 may only indicate correct usage of an application. The one-class SVM enables usage data that looks different from training data 114 (i.e., the correct usage key metrics) to be classified as an anomaly.

In some aspects, machine learning module 108 may be a machine learning algorithm that targets a prediction value based on independent variable(s). In some aspects, if only one key metric is utilized, machine learning module 108 may be using a linear regression model. In other aspects, if multiple key metrics are considered when generating the module 108, a polynomial regression or a multi-variable linear regression model is used. The goal of the machine learning module 108 is to learn how the application has historically behaved, and then predict how the application will behave in the future. For example, if the application had a certain latency and a certain number of lookups for the past ten Mondays between 12:00 am and 12:01 am, then the application can expect to have the same latency and lookups in an upcoming Monday. Machine learning module 108 may be trained and tested on training data 114 using a teaching method such as stochastic gradient descent.

ADS 102 may also generate statistical module 110 configured to identify outliers in the data associated with the at least one key metric. The statistical module uses a probability distribution that highlights data points associated with the at least one key metric that are not anomalous. Suppose that the key metric is the number of bytes read. For the time interval in consideration such as Monday between 12:00 am and 12:01 am, ADS 102 may create a probability distribution indicative of the bytes read. In this probability distribution, the number of bytes read that have the lowest probability of occurring (and yet having occurred) are considered outliers. For example, 95% of the time, the application may have had between 9 million bytes and 10 million bytes read in the given interval. However, 5% of the time, the application had over 15 million bytes read in the given interval. In some aspects, ADS 102 may set probability thresholds to identify outliers. In this case, any number of bytes having a probability of 5% of less are considered outliers.

Machine learning module 108 and statistical module 110 together provide a way to predict how an application will likely behave and how the application may behave in rare instances. There may be instances when conventional monitoring systems declare than an activity is an anomaly and malicious. However, the activity may be associated with an outlier that is caused by an authorized user of the computing device.

Subsequent to generating the machine learning model (e.g., a regression model) and the statistical model, data retriever 106 of ADS 102 may receive usage information in real-time for the application. ADS 102 may predict, using machine learning module 108, a usage pattern for the application relative to the at least one key metric. The usage pattern indicates a predicted set of values of the key metric at a future time. For example, machine learning module 108 may be provided with a time interval as an input and will output an expected number of bytes read during the interval. In this case, the output may be a data structure comprising a number of bytes read per second.

Security module 112 may be a module configured to compare the predicted usage pattern with a real-time pattern. For example, the output of machine learning module 108 may be 60 data points for a time interval associated with Monday between 12:00 am and 12:01 am (one for each second). The data points may be an expected number of bytes read. Data retriever 106 may also provide 60 data points for the same time interval. These data points may be the actual number of bytes read.

In some aspects, determining that the usage information received in real-time does not correspond to the predicted usage pattern comprises determining that an average difference, between values of the at least one key metric from the usage information received in real-time and the expected values of the at least key metric according to the predicted usage pattern, exceeds a threshold difference. For example, the average number of bytes read may be 10 million during the time interval and the average number of predicted bytes read may be 5 million. The threshold difference may be an initial value equal to 2 million. The difference between the average values is 5 million, which exceeds the threshold difference. Accordingly, security module 112 may determine that the usage information is a potential anomaly. It should be noted that the average number can be a mean value, a standard deviation value, a median value, etc.

In some aspects, security module 112 may compare each respective data point and determine a percent error in the prediction. For example, security module 112 may determine a percent error between the first data point in the predicted usage pattern and the first data point of the actual usage. For each percent error, if the percent error is greater than a threshold percent error (e.g., 20%), security module 112 may determine that the received data (i.e., usage information) does not correspond to the usage pattern. To determine whether the usage information is a potential anomaly, security module 112 may determine the number of data points with percent errors greater than the threshold percent error. If a majority of the data points have percent errors exceeding the threshold percent error, the usage information may be identified as a potential anomaly. The change from "potential anomaly" to "anomaly" is then based on a statistical model.

More specifically, security module 112 determines whether the received usage information comprises a known outlier rather than an anomaly via statistical module 110. For example, a known outlier may show that the application once had slightly less than 15 million bytes read on average during the given time interval (while the regression model predicted at most 10 million). If the received usage information also shows 14.5 million bytes read for a brief period of time within the time interval, the received usage information can be considered an outlier. However, if the usage information shows over a much higher number of bytes read (e.g., 20 million bytes read), security module 112 may determine that this amount of bytes were never read in the past and thus this may be anomalous. Thus, in response to determining that the usage information does not comprise an outlier, security module 112 may detect the behavioral anomaly, and generate an alert indicative of the behavioral anomaly. On the other hand, in response to determining that the usage information received in real-time corresponds to the predicted usage pattern or that the usage information comprises the known outlier, determining that the behavioral anomaly has not occurred and not generating the alert.

In some aspects, an anomaly may be detected when a window comprising several outliers is detected. For example, in response to receiving the usage information, ADS 102 may generate another statistical model of the received usage information (specifically if the predicted behavior does not match, to conserve processing power). The new received usage information may indicate that during the time interval, the number of bytes read was approximately 14 million 95% of the time and only 7 million 5% of the time. This prolonged percentage for reading more than 14 million bytes may be compared to an anomalous probability threshold (e.g., 70%). When the percentage is greater than the anomalous probability threshold, the determination can be made that the number of bytes is an outlier, but the probability of the outlier occurring is high enough to be considered an anomaly.

In some aspects, in order to detect a behavioral anomaly when an outlier is detected, security module 112 determines if more than a threshold number of outlying key metrics are detected at once. For example, an outlying key metric may be the number of bytes read. Another outlying key metric may be the amount of latency. Suppose that of 5 tracked key metrics, 3 have outliers. In response to determining that a threshold amount of key metrics have outliers, security module 112 may detect a behavioral anomaly. In some aspects, security module 112 may detect a behavioral anomaly specifically if the amount of key metrics that have outliers are independent key metrics. An independent key metric may be a key metric that does not get affected by another key metric. For example, the number of bytes read may be correlated to the number of file lookups. Accordingly, if outliers are detected in both key metrics, only one outlier is counted for the purposes of comparing with the threshold amount. In contrast the number of bytes read may be unrelated to the number of accounts on an application. Accordingly, if outliers are detected in both key metrics, two outliers may be counted. ADS 102 may keep track of all key metrics and each of their independent key metric counterparts in a database.

It should be noted that the use of the statistical model eases the reliance on thresholds by machine learning module 108. This is because even if the application is not used as historically expected (e.g., percent errors or average difference is too different from a threshold percent error or threshold difference, respectively), the check for outliers minimizes the chance of false positives/negatives. This is because usage that may be normally misclassified as an anomaly may be correctly classified as normal usage if the usage turns out to be an outlier according to the statistical model.

Furthermore, the thresholds used by modules 108 and 110 may be adjusted based on whether usage classified as an anomaly is in fact an anomaly. For example, security module 112 may generate an alert indicating that usage of the application during a given time interval is an anomaly. This alert may be generated on a computing device of a user (e.g., an administrator of device 104) in the form of an email, text, audio output, application notification, etc. In response to generating the alert, ADS 102 may receiving a response to the alert indicating that the behavioral anomaly is a false positive. For example, the alert may request confirmation whether the usage was by the user or an unauthorized entity. The user may indicate that the usage was authorized. Accordingly, security module 112 may adjust the thresholds used by modules 108 and 110 (e.g., by easing them). In the example of the threshold difference associated with average values of key metrics (both predicted and actual), security module 112 may automatically increase the threshold difference.

In some aspects, in response to receiving a response to the alert indicating that the behavioral anomaly is a false positive, security module 112 may also adjust both the regression model and the statistical model based on the usage information received in real-time. More specifically, ADS 102 may retrain the regression model using an updated dataset where the collected usage information received in real-time is classified as non-anomalous and may regenerate the statistical model, which may identify the usage information as an outlier.

Figure 2:
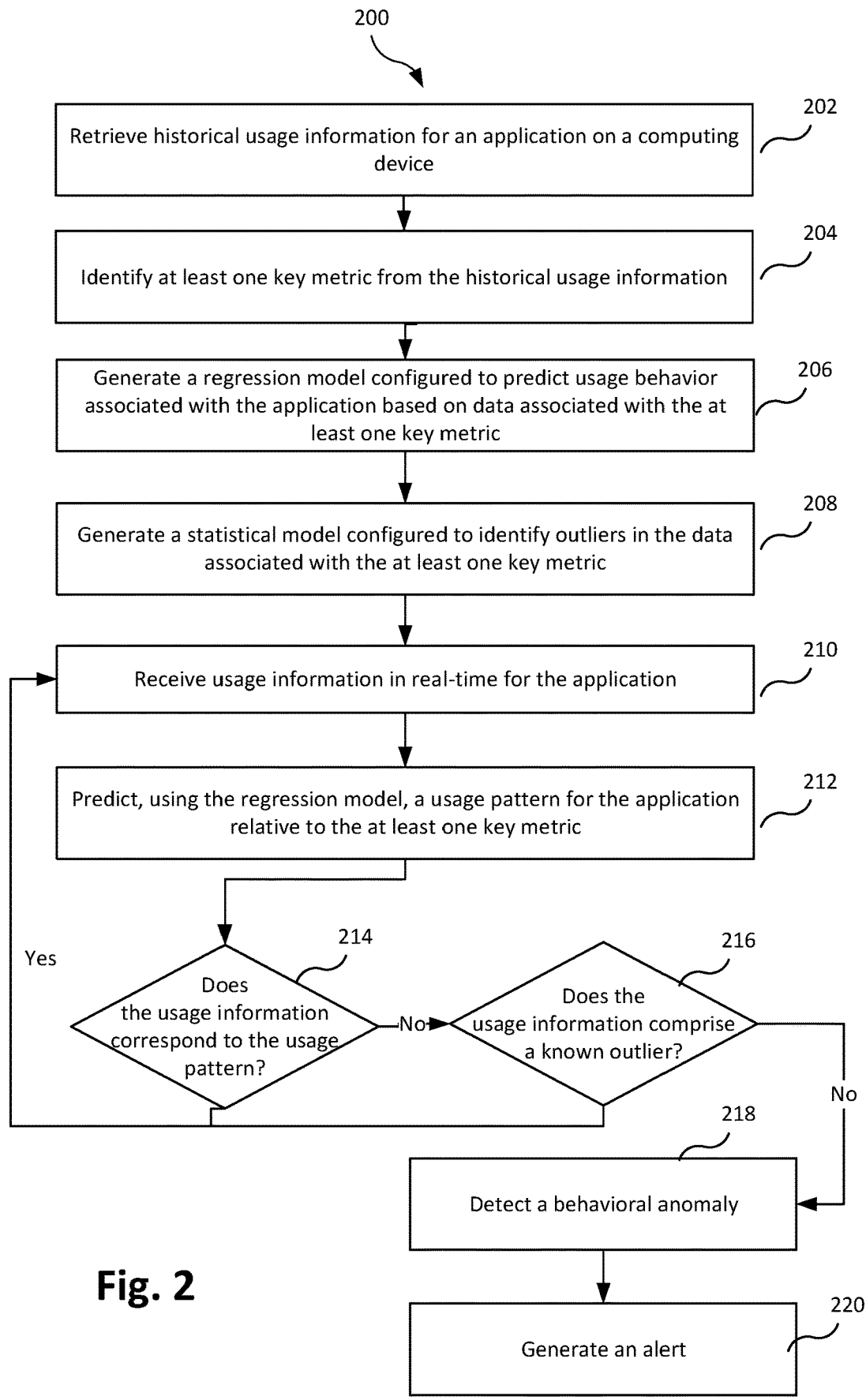
FIG. 2 is a flow diagram illustrating a method for detecting behavioral anomalies in applications, in accordance with aspects of the present disclosure.

FIG. 2 is a flow diagram illustrating method 200 for detecting behavioral anomalies in applications, in accordance with aspects of the present disclosure. At 202, data retriever 106 retrieves historical usage information for an application on a computing device. At 204, data retriever 106 identifies at least one key metric from the historical usage information. At 206, anomaly detection system 102 generates a machine learning module 108 configured to predict usage behavior associated with the application based on data associated with the at least one key metric. At 208, anomaly detection system 102 generates a statistical module 110 configured to identify outliers in the data associated with the at least one key metric.

At 210, data retriever 106 receives usage information in real-time for the application. At 212, anomaly detection system 102 predicts, using the machine learning module 108, a usage pattern for the application relative to the at least one key metric. At 214, anomaly detection system 102 determines whether the usage information corresponds to the usage pattern. In response to determining that the usage information does not correspond to the usage pattern, at 216, anomaly detection system 102 determines whether the usage information comprises a known outlier. In response to determining that the usage information does not comprise a known outlier, at 218, security module 112 detects a behavioral anomaly and at 220, security module 112 generates an alert. It at 214 or 216, anomaly detection system 102 determines either that the usage information corresponds to the usage pattern or that the usage information comprises a known outlier, method 200 returns to 210 as anomaly detection system 102 continues to monitor for behavioral anomalies.

FIG. 3 is a block diagram illustrating a computer system 20 on which aspects of systems and methods for detecting behavioral anomalies in applications may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting a behavioral anomaly in an application, the method comprising: retrieving, by a security application, historical usage information for an application on a computing device; identifying, by the security application, at least one key metric from the historical usage information; generating, by the security application, a regression model configured to predict usage behavior associated with the application based on data associated with the at least one key metric; generating, by the security application, a statistical model configured to identify outliers in the data associated with the at least one key metric; subsequent to generating the regression model and the statistical model, receiving, by the security application, usage information in real-time for the application; predicting, using the regression model of the security application, a usage pattern for the application indicating expected values of the at least one key metric; in response to determining that the usage information received in real-time does not correspond to the predicted usage pattern, determining via the statistical model of the security application whether the usage information comprises a known outlier; in response to determining that the usage information does not comprise the known outlier, detecting, by the security application, the behavioral anomaly; and generating, by the security application for output on the computing device, an alert indicative of the behavioral anomaly.

2. The method of claim 1, wherein the historical usage information occurred within a time interval that is periodic, and wherein predicting the usage pattern further comprises using a version of the regression model associated with the time interval.

3. The method of claim 1, wherein the statistical model is a probability distribution that highlights data points associated with the at least one metric that are not anomalous.

4. The method of claim 1, wherein the at least one key metric comprises at least one of:
   (1) client connections,
   (2) latency,
   (3) number of account lookups,
   (4) bytes read, and
   (5) number of file lookups.

5. The method of claim 1, further comprising:
   in response to determining that the usage information received in real-time corresponds to the predicted usage pattern or that the usage information comprises the known outlier, determining that the behavioral anomaly has not occurred and not generating the alert.

6. The method of claim 1, wherein determining that the usage information received in real-time does not correspond to the predicted usage pattern further comprises:
   determining that an average difference, between values of the at least one key metric from the usage information received in real-time and the expected values of the at least key metric according to the predicted usage pattern, exceeds a threshold difference.

7. The method of claim 6, further comprising:
   receiving a response to the alert indicating that the behavioral anomaly is a false positive;
   automatically increasing the threshold difference.

8. The method of claim 1, further comprising:
   receiving a response to the alert indicating that the behavioral anomaly is a false positive;
   adjusting both the regression model and the statistical model based on the usage information received in real-time, wherein the regression model is retrained on an updated dataset and the statistical model indicates an updated outlier.

9. A system for detecting a behavioral anomaly in an application, the system comprising: a hardware processor configured to execute a security application, wherein the security application is configured to: retrieve historical usage information for an application on a computing device; identify at least one key metric from the historical usage information; generate a regression model configured to predict usage behavior associated with the application based on data associated with the at least one key metric; generate a statistical model configured to identify outliers in the data associated with the at least one key metric; subsequent to generating the regression model and the statistical model, receive usage information in real-time for the application; predict, using the regression model, a usage pattern for the application indicating expected values of the at least one key metric; in response to determining that the usage information received in real-time does not correspond to the predicted usage pattern, determine via the statistical model whether the usage information comprises a known outlier; in response to determining that the usage information does not comprise the known outlier, detect the behavioral anomaly; and generate, for output on the computing device, an alert indicative of the behavioral anomaly.

10. The system of claim 9, wherein the historical usage information occurred within a time interval that is periodic, and wherein predicting the usage pattern further comprises using a version of the regression model associated with the time interval.

11. The system of claim 9, wherein the statistical model is a probability distribution that highlights data points associated with the at least one metric that are not anomalous.

12. The system of claim 9, wherein the at least one key metric comprises at least one of:
   (1) client connections,
   (2) latency,
   (3) number of account lookups,
   (4) bytes read, and
   (5) number of file lookups.

13. The system of claim 9, wherein the hardware processor is further configured to:
   in response to determining that the usage information received in real-time corresponds to the predicted usage pattern or that the usage information comprises the known outlier, determine that the behavioral anomaly has not occurred and not generating the alert.

14. The system of claim 9, wherein the hardware processor is configured to determine that the usage information received in real-time does not correspond to the predicted usage pattern by:
   determining that an average difference, between values of the at least one key metric from the usage information received in real-time and the expected values of the at least key metric according to the predicted usage pattern, exceeds a threshold difference.

15. The system of claim 14, wherein the hardware processor is further configured to:
   receive a response to the alert indicating that the behavioral anomaly is a false positive;
   automatically increase the threshold difference.

16. The system of claim 9, wherein the hardware processor is further configured to:
   receive a response to the alert indicating that the behavioral anomaly is a false positive;

adjust both the regression model and the statistical model based on the usage information received in real-time, wherein the regression model is retrained on an updated dataset and the statistical model indicates an updated outlier.

17. A non-transitory computer readable storage medium storing thereon computer executable instructions for detecting a behavioral anomaly in an application, including instructions for: retrieving, by a security application, historical usage information for an application on a computing device; identifying, by the security application, at least one key metric from the historical usage information; generating, by the security application, a regression model configured to predict usage behavior associated with the application based on data associated with the at least one key metric; generating, by the security application, a statistical model configured to identify outliers in the data associated with the at least one key metric; subsequent to generating the regression model and the statistical model, receiving, by the security application, usage information in real-time for the application; predicting, using the regression model of the security application, a usage pattern for the application indicating expected values of the at least one key metric; in response to determining that the usage information received in real-time does not correspond to the predicted usage pattern, determining via the statistical model of the security application whether the usage information comprises a known outlier; in response to determining that the usage information does not comprise the known outlier, detecting, by the security application, the behavioral anomaly; and generating, by the security application for output on the computing device, an alert indicative of the behavioral anomaly.

18. The non-transitory computer readable storage medium of claim 17, wherein the historical usage information occurred within a time interval that is periodic, and wherein predicting the usage pattern further comprises using a version of the regression model associated with the time interval.

19. The non-transitory computer readable storage medium of claim 17, wherein the statistical model is a probability distribution that highlights data points associated with the at least one metric that are not anomalous.

20. The non-transitory computer readable storage medium of claim 17, wherein the at least one key metric comprises at least one of:
   (1) client connections,
   (2) latency,
   (3) number of account lookups,
   (4) bytes read, and
   (5) number of file lookups.

* * * * *